US006920130B2

(12) United States Patent
Ramey

(10) Patent No.: US 6,920,130 B2
(45) Date of Patent: Jul. 19, 2005

(54) GATEWAY ADAPTER FOR A PBX SYSTEM

(75) Inventor: Kenneth S. Ramey, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 712 days.

(21) Appl. No.: 09/735,790

(22) Filed: Dec. 14, 2000

(65) Prior Publication Data
US 2002/0075879 A1 Jun. 20, 2002

(51) Int. Cl.[7] ............................................. H04L 12/66
(52) U.S. Cl. .................. 370/352; 370/395.2; 379/93.15
(58) Field of Search ................................. 370/352, 353, 370/354, 356, 395.2; 379/93.01, 93.05, 93.15, 224, 225, 229, 234; 709/204, 224, 228, 227, 246, 249; 455/433, 554.1, 555; 703/13, 20, 21, 22, 23, 24

(56) References Cited

U.S. PATENT DOCUMENTS 6,463,051 B1 * 10/2002 Ford ........................... 370/352
2003/0081590 A1 * 5/2003 Maroulis et al. ............ 370/352

FOREIGN PATENT DOCUMENTS

EP          0881 812 A       12/1998
EP          0881812 A2 *     12/1998    ............ H04M/7/00

OTHER PUBLICATIONS

Korpi, Markku and Kumar, Vineet, "Supplementary Service in the H.323 IP Telephony Network", Jul. 1999, IEEE Communications Magazine, pp 118–125.*

Korpi, M., et al, "Supplementary Services in the H.323 IP Telephony Network," IEEE Communications Magazine, IEEE Service Center, Piscataway, N.J., J.S., vol. 37, no. 7, Jul. 1999, pp. 118–125, XP000835313, ISSN: 0163–6804.

* cited by examiner

Primary Examiner—Wellington Chin
Assistant Examiner—John Shew

(57) ABSTRACT

A gateway adapter for a circuit switched PBX system to allow the PBX system to interoperate with a packet switched network containing a remote services unit. The gateway adapter includes a PBX interface for communicating with the PBX system, a network interface for communicating with the packet switched network and an interoperation functional unit to effect manipulation on data received by the two interfaces to allow the PBX system and the packet switched network to interoperate. One example of interoperation is to perform call processing functions on call sessions through the PBX system at a remote network services unit residing in the packet switched network.

53 Claims, 8 Drawing Sheets

GATEWAY ADAPTER FOR A PBX SYSTEM

FIELD OF THE INVENTION

The invention relates to telecommunication devices, in particular to a gateway adapter that, when used in conjunction with a Private Branch Exchange (PBX) system, allows the combination of the two of them to interoperate with IP network based services—in particular, an IP network based Call Server. The gateway adapter also extends to a method for front-ending a PBX such that their combination can exchange information with a packet switched network. In addition, the gateway adapter extends to an apparatus for offering IP network based telephony-related services through to PBX based lines and trunks via a device emulation function.

BACKGROUND OF THE INVENTION

Circuit switching and packet switching are different and well-known methods for establishing a connection between two endpoints to permit the exchange of voice or data signals. In the dial-up telephone network, for example, a caller's line goes to a switching center or switch, where the actual connection is made to the called party. In the case of a circuit switch, a permanent connection is set-up and maintained for the duration of the call. A packet switch does not establish a permanent connection, rather the information is assembled in packets that are transmitted rapidly over a channel dedicated to the connection only for the duration of the packet's transmission.

Telephone systems based on IP packet switching offer many advantages over circuit switching systems. In particular, packet switching telephone systems have a distributed architecture and offer a wide variety of features that are difficult or costly to implement in circuit switched telephone systems and the separation of telephony services from telephony access allows their independent evolution. Moreover, adapting multiple PBXs to a single network telephony server (and hence a single distributed PBX) represents a significant consolidation opportunity (of a multi node network into a large single node network) and hence a simplification value-add.

Most PBX systems in existence today are circuit switched devices. In order to offer the above advantages to customers who own these existing PBXs, telephone equipment manufacturers are developing and commercializing packet switched telephone systems that are intended to replace existing PBX devices, or they are evolving their legacy TDM PBXs. This latter method may be preferred by customers who are hesitant to replace their existing PBX when it is not yet totally obsolete.

Accordingly, there is a need in the industry to develop a novel approach to upgrade a PBX such that it can benefit from this new packet switched telephony systems paradigm.

SUMMARY OF THE INVENTION

Under a broad aspect the invention provides a gateway adapter for connecting a PBX system entity to a packet switched network entity. The gateway adapter includes a PBX interface for connection to the PBX entity to communicate with the PBX entity using a PBX protocol, and a network interface for communicating with a packet switched network entity. An interoperation functional unit is associated with both interfaces. The interoperation functional unit effects manipulations on data received by the interfaces from the two entities such as to allow the two entities to interoperate.

Hence, the gateway adapter allows the PBX to interoperate with a packet switched network without requiring either displacement of or any significant modification to the actual PBX itself. This is a much less expensive alternative to a complete replacement of the PBX system by a new packet switched telephone system.

Optionally, the gateway adapter contains line and trunk emulation functionality, and is able to manage all of the adapter's functionality separately from the management system of the PBX, and separately from the management system of the IP network based services.

Under a specific non-limitative example of implementation, the PBX system is a circuit-switched device and includes a plurality of internal telephone line ports for connection to telephone terminals and a plurality of trunk ports that interface to the PSTN or ISDN. The PBX system includes a main processing unit that combines call processing and switching functions.

Under this example, when the PBX system is front-ended with the gateway adapter, the trunk ports are connected to the PBX interface of the gateway adapter such that media and signals are now directed to the PBX interface rather than the PSTN or ISDN.

As part of the upgrade, the PBX system is configured to disable the call processing functions it normally provides and provide a passthrough service instead. Accordingly, when a user on the PBX attempts to initiate a call, either internal or external he or she automatically gets access to one of the trunk ports connected to the adapter.

The gateway adapter relies on a remote network services unit residing on the packet switched network to provide call processing services, thereby alleviating the PBX's own call processing services from its traditional responsibilities. In particular, the interoperation functional unit processes control signals in the PBX system to generate communication control data in the proper protocol compatible with the remote network services unit and sends the communication control data in the packet switched network through the network interface. The gateway adapter then receives communication control data from the remote network services unit containing instructions on how to handle the call.

Under an exemplary embodiment, the interoperation functional unit has two main components, namely a signal processing unit and a media processing unit. The signal processing unit provides an overall controlling function and the media processing unit handles media conversions, such as conversions of audio data received or sent to the PBX system from one format to another.

The instructions that the gateway adapter receives from the remote network services unit on how to handle the call may include details on where in the packet switched network to send the media from the PBX system (speech information in one direction of the call session) and on how to handle the media received from the packet switched network (speech information in the other direction of the call session) i.e. which PBX port to deliver the media to.

Optionally, the interoperation functional unit is designed to implement a device emulator such that the gateway adapter behaves as a device of a specific type with which the remote network services unit has been specifically designed to interact. This feature allows using the gateway adapter with a variety of remote network services units that have not been conceived originally to work with the gateway adapter, as well as with a variety of PBXs that were not conceived originally to work with the devices assumed by the network services units.

Under another broad aspect, the invention provides an apparatus for providing telephony-related services to a plurality of telephone terminals of a first type, the apparatus including a network interface for exchanging signals with a remote network services unit through a packet switched network, the apparatus implementing a device emulator to make the apparatus behave toward the remote network services unit as a telephone terminal of a second type, where the telephone terminal of the first type is different from the telephone terminal of the second type.

BRIEF DESCRIPTION OF THE DRAWINGS

A detailed description of examples of implementation of the present invention is provided hereinbelow with reference to the following drawings, in which.

Figure 1:
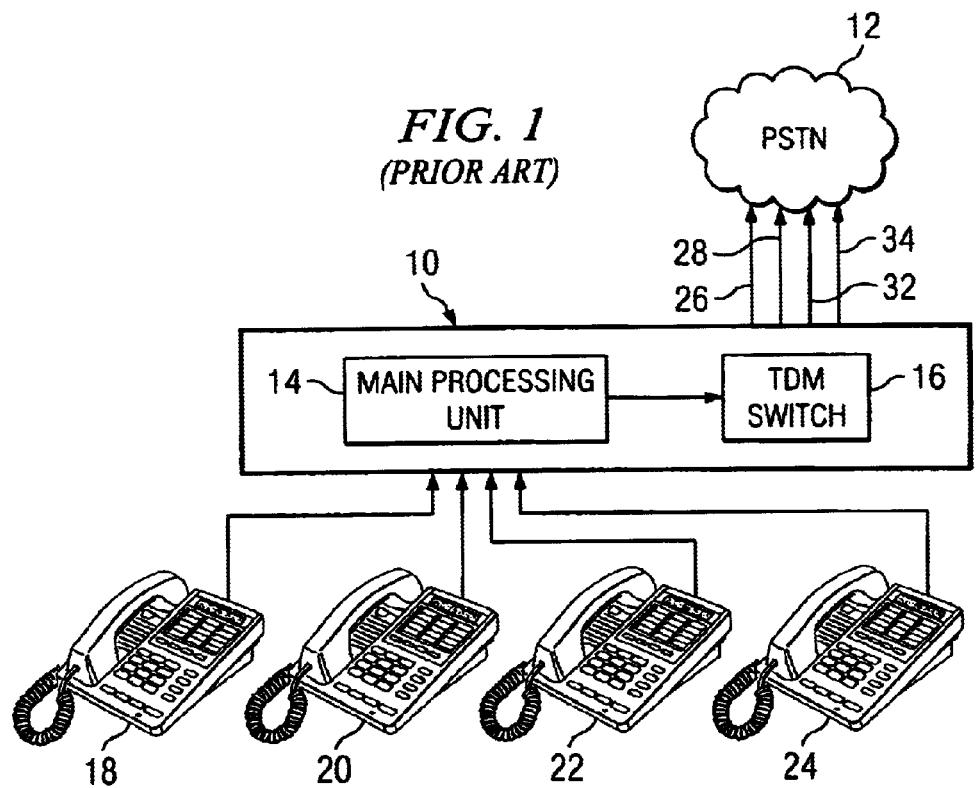
FIG. 1 is a block diagram of a prior art PBX system.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates the block diagram of a PBX system 10 according to the prior art. The PBX system 10 is a centralized device that provides telephone services to a group of telephone terminals. In particular, the PBX system 10 includes a plurality of internal ports for connection to telephone terminals 18, 20, 22 and 24. Also the PBX system 10 includes a plurality of external trunk ports 26, 28, 32 and 34 that in a typical PBX application would connect to the telephone network, such as the Public Switched Telephone Network (PSTN) 12. The PBX system 10 also comprises a main processing unit 14 that provides an overall controlling function and call processing services. The main processing unit 14 controls a Time Division Multiplexing (TDM) circuit switch 16 that can establish audio paths between internal and/or external ports to set-up call sessions.

Figure 2:
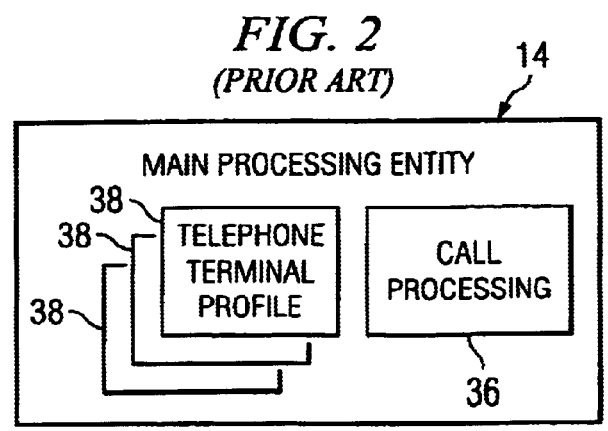
FIG. 2 is a functional block diagram of the main processing unit of the PBX system shown in FIG. 1.

FIG. 2 provides a functional block diagram of the main processing unit 14. In addition to the call processing functions 36, the main processing unit 14 maintains for each telephone terminal 18, 20, 22 and 24 a telephone terminal profile 38 that establishes how certain features of the individual telephone terminals 18, 20, 22 and 24 will operate. This characteristic allows a certain level of customization of the individual telephone terminals 18, 20, 22 and 24 to suit the user's preferences. For example, the telephone terminal profile 38 specifies the particular ring tone, ring intensity, audio level, language of the messages that may need to be displayed, among many other possibilities.

Figure 3:
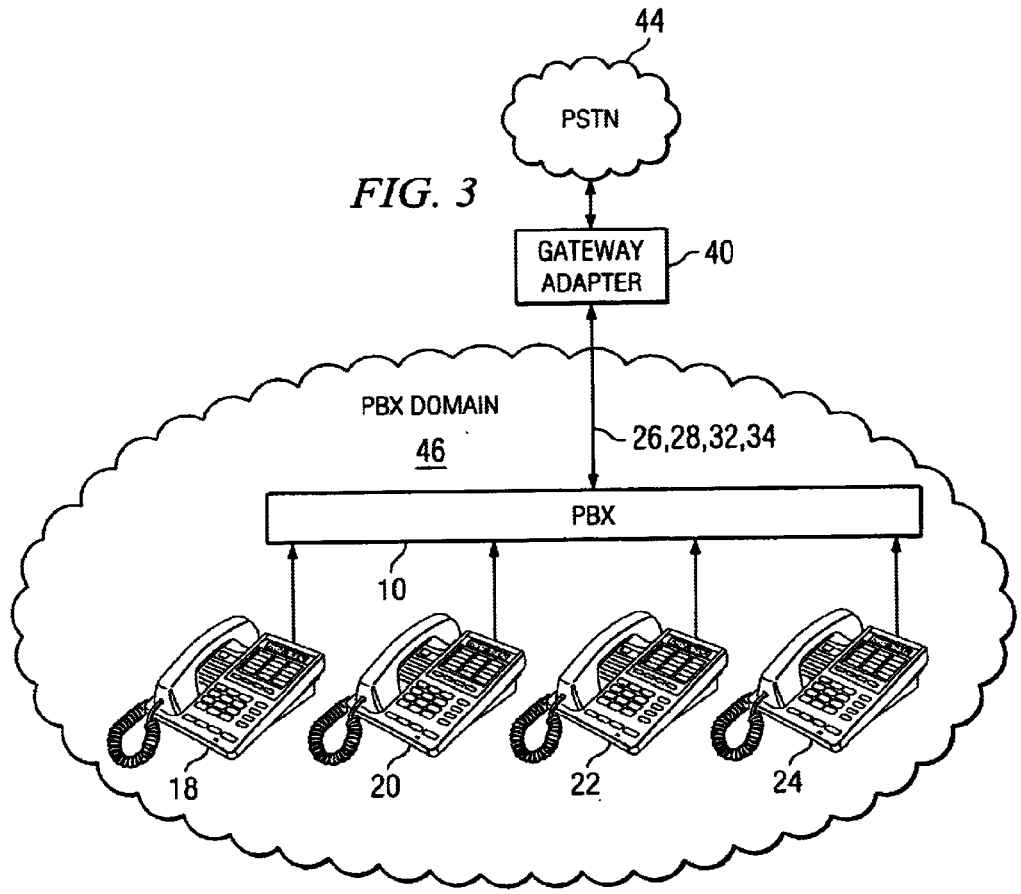
FIG. 3 is a block diagram of the PBX system shown in FIG. 1, upgraded with a gateway adapter constructed in accordance with a non-limiting example of implementation of the present invention.

The PBX system 10 is a circuit switched device that is designed to connect to the PSTN 12 that is also circuit switched. This specification describes a gateway adapter that allows the PBX system 10 to interoperate with a packet switched network. An example of implementation of a gateway adapter 40 according to the invention is shown in FIG. 3. The gateway adapter 40 forms a point of interaction between different domains, namely the PBX domain 46 and a packet switched network 44.

The gateway adapter 40 upgrades the PBX system 10 such that the PBX system 10 can interoperate with the packet switched network 44. In particular, such an upgrade allows making use of a remote network services unit that resides on the packet switched network 44. An example of a remote network services unit is an applications server residing at a certain node of the packet switched network 44. The applications server connects with the gateway adapter 40 and the PBX system 10 in a client/server relationship and offers to the gateway adapter 40 and the PBX system 10 a host of functions, such as call processing functions, trunk access functions (a gateway to the PSTN), etc. To take advantage of the functions offered by the remote network services unit, the PBX system 10 is configured to passthrough any call processing that the PBX system 10 would normally provide. This results in a PBX system 10 in which when a user goes off-hook at one of the telephone terminals 18, 20, 22 and 24, the TDM switch 16 responds by auto-originating an outgoing trunk call out an associated trunk port at one of the trunk ports 26, 28, 32, and 34, and subsequently setting a connection path from the telephone terminal to one of the external trunk ports 26, 28, 32 and 34. Conversely, when an incoming call arrives at one of the trunk ports (26, 28, 32, or 34), it is treated as an inbound Direct Inward Dialing (DID) call by the PBX and is subsequently delivered by the PBX to the appropriate telephone terminal 18, 20, 22, or 24.

Figure 4A:
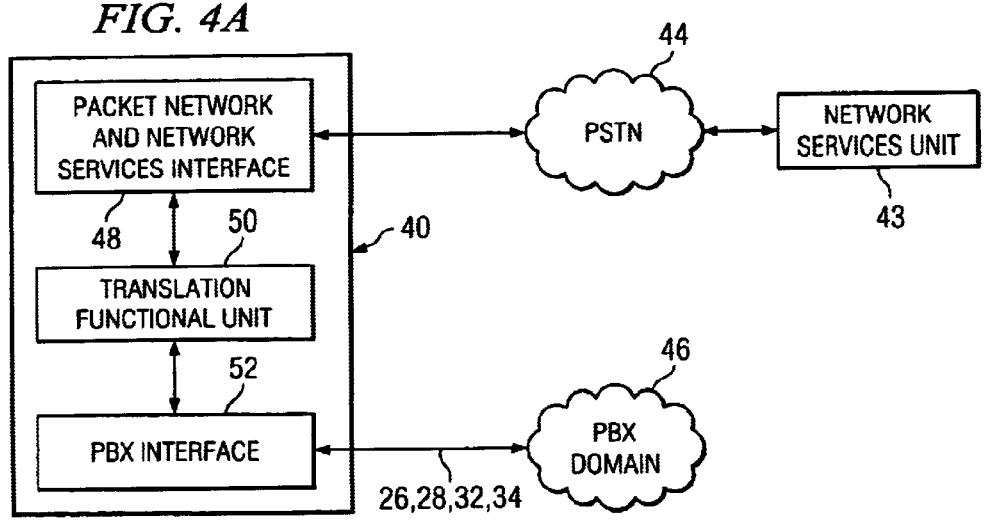
FIG. 4a is a high-level block diagram of the gateway adapter shown in FIG. 3.

A functional block diagram of the gateway adapter 40 is illustrated in FIG. 4a. The gateway adapter 40 includes a PBX interface 52 that connects to the PBX system 10. The PBX interface 52 is the agency that forms a point of interaction between the gateway adapter 40 and the PBX system 10 and through which transit media (such as audio information) signals and control signals. In particular, the PBX interface 52 connects to the external telephone line ports 26, 28, 32 and 34. The PBX interface 52 receives from and sends to the external telephone line ports 26, 28, 32 and 34 media and control signals.

FIG. 4a also shows a network services unit 43 communicating with the packet switched network 44.

Figure 4B:
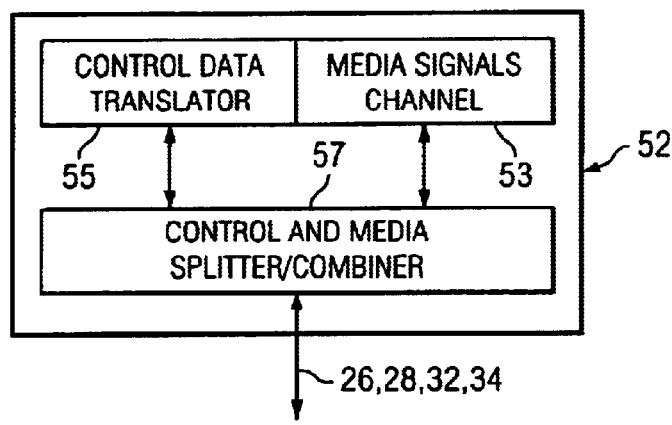
FIG. 4b is a block diagram of a control unit of the gateway adapter shown in FIG. 4.

FIG. 4b is a block diagram of the PBX interface 52. The PBX interface 52 includes three main components namely a media signals channel 53, a control data translator 55, and a media/control signal splitter/combiner 57. The media signals channel 53 connects with the media extracted (by the splitter/combiner 57) from external telephone line ports 26, 28, 32 and 34 and effects media signals passing. In particular, the media signals channel 53 transports media signals exchanged between components of the gateway adapter 40 and any one of the external telephone line ports 26, 28, 32 and 34. The control data translator 55 effects a protocol conversion. In the case of control data sent from the PBX system 10 to the gateway adapter, the control data translator 55 will convert the form of the data into a format that the gateway adapter 40 and the remote network services unit 43 can use. Similarly, for control data sent form the gateway adapter 40 to the PBX system 10 the control data translator 55 effects the opposite conversion. In a possible variant, the PBX interface 52 can be provided with several control data translators allowing the gateway adapter 40 to function with PBX systems using different control data protocols. This feature renders the gateway adapter 40 more flexible in that it can adapt to a range of different PBX systems.

Referring back to FIG. 4a, the gateway adapter 40 also includes a packet switched network interface 48 that forms a point of interaction between the gateway adapter 40 and the packet switched network 44. In a specific example of implementation of this invention, the gateway adapter 40 is designed to interact with a packet switched network 44 that uses the IP protocol. The packet switched network interface 48 effects mainly the necessary data format conversion to allow media signals and communication control data to be exchanged between the gateway adapter 40 and the packet switched network 44 and the remote network services unit 43.

Figure 5:
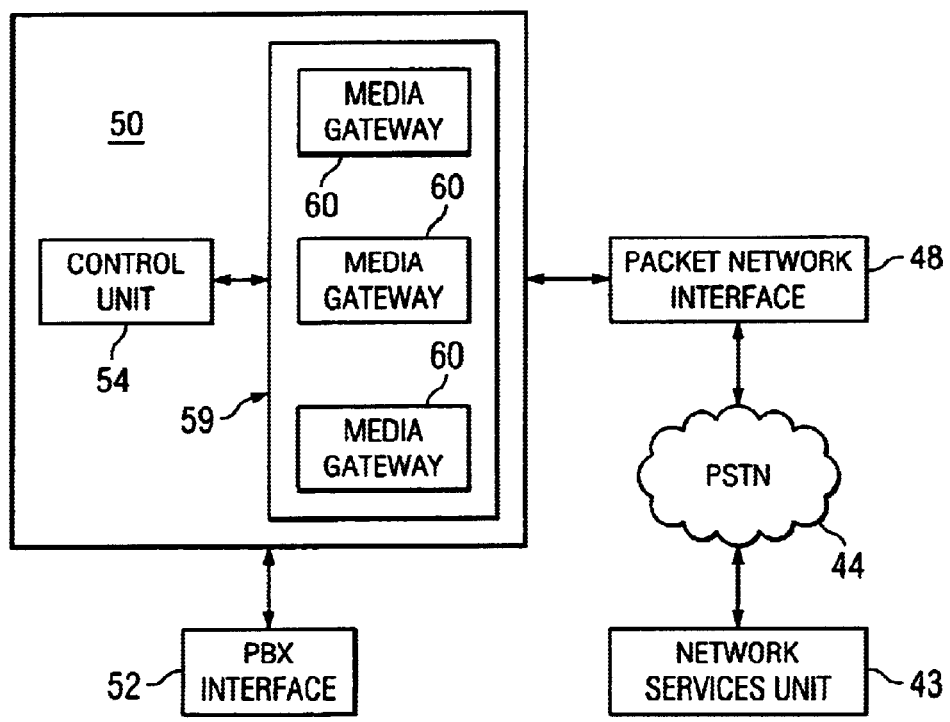
FIG. 5 is a block diagram of the gateway adapter depicted in FIG. 4 showing additional details.

The gateway adapter 40 is also provided with an interoperation functional unit 50 whose task, broadly stated is to effect the necessary manipulations on data (media and control) exchanged between the entities (PBX system 10, packet switched network 44) such that the two entities can functionally interoperate. A block diagram of the interoperation functional unit 50 is provided at FIG. 5. The interoperation functional unit 50 has a control unit 54 and a media signals converter unit 59 that includes a plurality of media gateways 60 containing one or more types of codecs.

Figure 6:
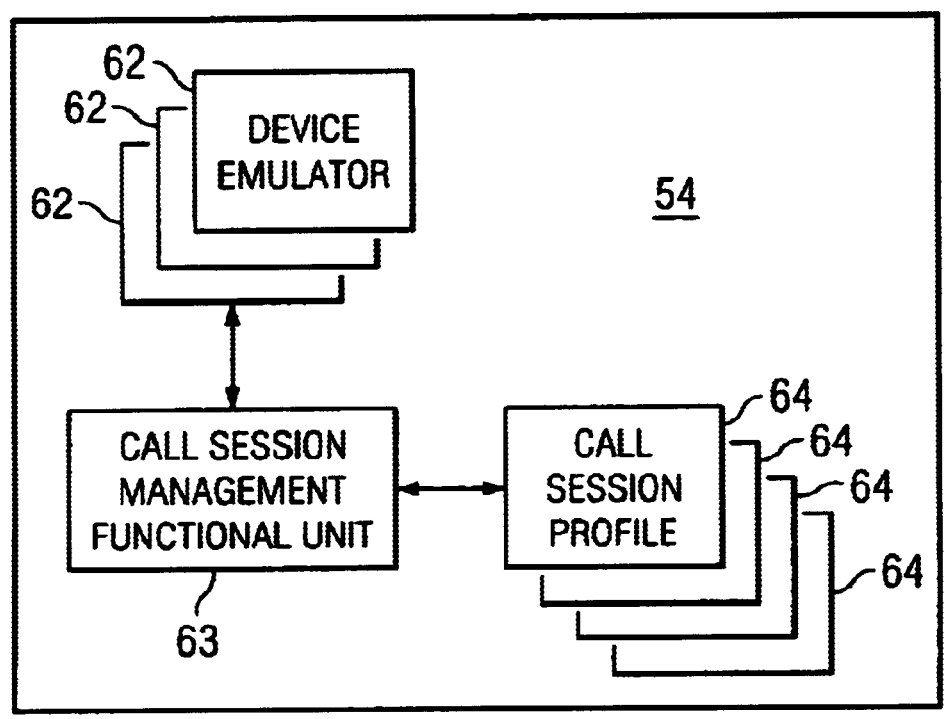
FIG. 6 is a functional block diagram of the control unit of the gateway adapter depicted in FIG. 4.

A functional block diagram of the control unit 54 is illustrated in FIG. 6. The control unit 54 includes one or more device emulators 62 and a call session management functional unit 63. The purpose of the device emulator 62 is to make the gateway adapter 40 behave during its interaction with the remote network services unit 43 as a device that has been specifically designed to interact with the remote network services unit 43. It is to be understood that the control unit 54 can implement a number of different device emulators, each being adapted to imitate a different device. At any given time one or more device emulators can be active, but normally only one per call session.

The device emulator 62 provides a bi-directional functional translation of control data exchanged between the PBX system 10 and the remote network services unit 43. A specific example will help illustrate this point. The remote network services unit may send to the gateway adapter 40 control data including display information in an attempt to display a message on a display screen of the device emulated by the gateway adapter 40. As per the previous example, assume that this device is a "stimulus" telephone terminal. The device emulator 62 intercepts this control data and analyzes it to determine if the actual telephone terminals 18, 20, 22 and 24 can handle it. If the control data can be handled unmodified by the telephone terminal 18, 20, 22 and 24 then the device emulator 62 passes the control data unchanged. Otherwise, the device emulator 62 will perform the necessary modifications such as to put the control data in a form that the telephone terminal 18, 20, 22 and 24 can use. For example, assume that the telephone terminal 18, 20, 22 and 24 has no display. The device emulator 62 needs to modify the control data since in its current form it cannot be handled by the telephone terminal 18, 20, 22 and 24. How the control data will be handled is a matter of design choice. One possibility under this example is simply to flush the control data since the telephone terminal 18, 20, 22 and 24 has no display capabilities. Another possibility is to generate a certain ring tone at the telephone terminal 18, 20, 22 and 24. Under a different example, assume that the telephone terminal 18, 20, 22 and 24 has a display, however, the display is smaller than the display on the emulated device and cannot handle the information in the control data. Under those circumstances, the device emulator 62 can re-format the data to be displayed so that it becomes compatible with the display of the telephone terminal 18, 20, 22 and 24.

For control data sent from the telephone terminal 18, 20, 22 and 24 the same procedure as described above is followed. The control data is analyzed and modified if necessary such that it would appear to the remote network services unit 43 to originate from a device other than the terminal 18, 20, 22 and 24 and than the gateway adapter 40.

The bi-directional functional translation is made by mapping functional capabilities of the telephone terminal 18, 20, 22 and 24 to the functional capabilities of the device emulated by the device emulator 62. When the device emulator 62 is software implemented, the mapping of functional capabilities can be realized by creating a set of program modules, each program module handling the translation of a particular function or event. When a particular function or event is encountered by the device emulator 62, the corresponding program module is invoked and the functional translation made.

The call session management functional unit 63 controls the operation of the gateway adapter 40 when a call session must be set-up involving the PBX system 10. The call session management functional unit 63 can create several instances of a call session profile 64, each call session profile 64 being associated to a call session. A call session profile 64 holds information that allows the gateway adapter 40 to properly manage the media signals coming from the PBX system 10, the media signals directed at the PBX system 10 coming from the packet switched network 44 and also manage control signals exchanged with the PBX system 10 and communication control data exchanged with the remote network services unit.

The operation of the gateway adapter 40 will be better understood from the following examples.

Call Session Between the PBX Domain 46 and the Packet Switched Network 44

Figure 7:
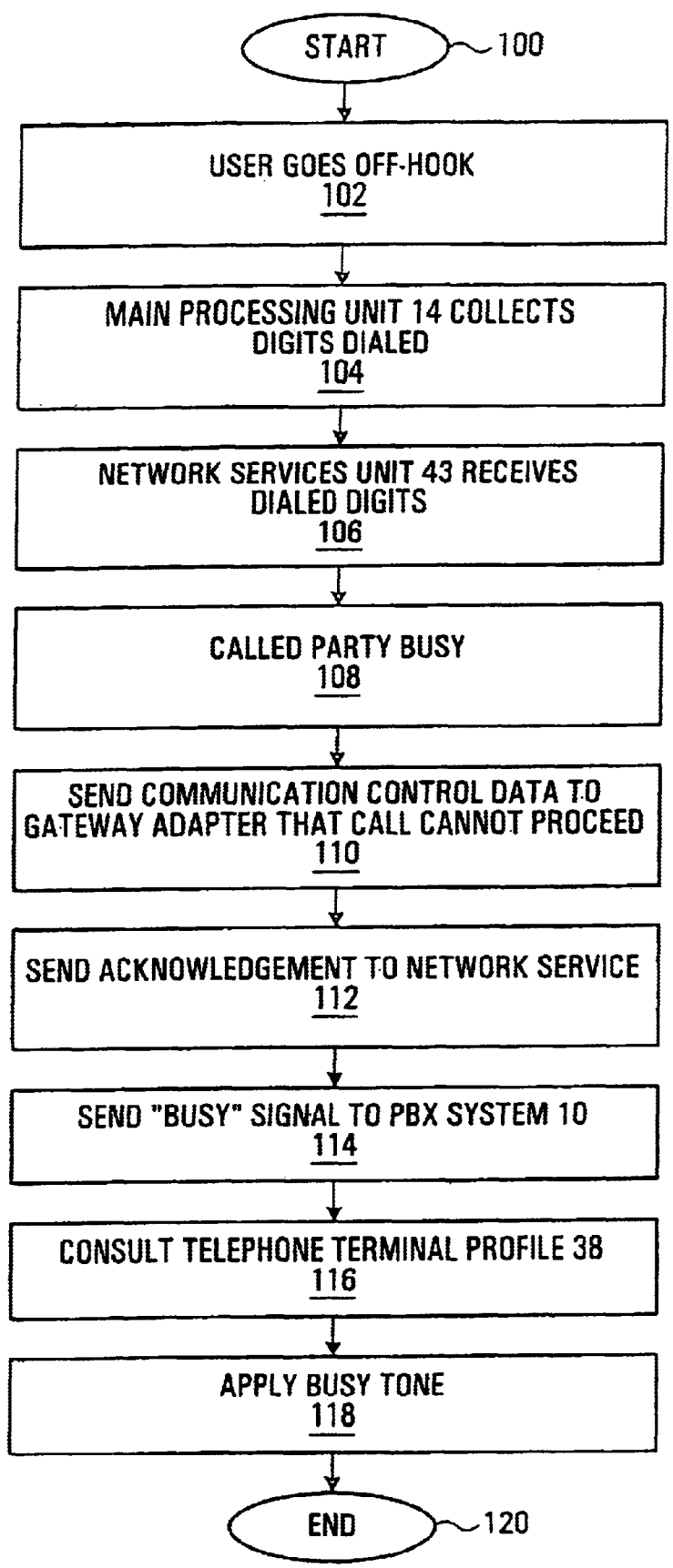
FIG. 7 is a flowchart illustrating the various events that take place during a call session attempt spanning the PBX domain and the packet switched network, where the call session cannot proceed due to a busy condition.

The various events that occur during such a call session are illustrated by the flowchart of FIG. 7. This flowchart should be considered in conjunction with the block diagram of FIG. 6 and the flowchart of FIG. 10.

The process starts at step 100. At step 102 the user goes off-hook at say the telephone terminal 18. This event is detected by the main processing unit 14 of the PBX system 10 and relayed to the gateway adapter 40 over the control data path via one of the interfaces 26, 28, 32, or 34. All digits dialed by the user at the telephone terminal 18 are collected by the main processing unit 14. After collecting the digits, the main processing unit 14 prefixs them with a '9' digit, and effectively make an outgoing trunk call and signals the dialed digits (minus the '9') onto the control unit 54. At step 104, the control unit 54 assembles the digits (and other control information) into a data packet and sends this data packet through the packet network interface 48 to the network services unit 43 residing in the packet switched network 44. In this example, the network services unit 43 provides call-processing functions and it is designed to interact with telephone terminals that are different from the telephone terminal 18. For example, the network services unit 43 can be designed to interact with a so-called "stimulus" based telephone terminals. Those type of terminals are known in the art and there is no need to describe them here. Before sending the communication control data, the control unit 54 invokes the device emulator 62 to perform the necessary functional translations as described earlier such that the network services unit 43 "thinks" that it is receiving this data from a "stimulus" based telephone terminal.

At step 106 the remote network services unit 43 receives the data packet, extracts the dialed digits and determines that the user at the telephone terminal 18 is attempting to set up a call that terminates outside the PBX domain 46.

At step 108 the remote network services unit 43 is "aware" of the status of the telephone terminal that the user at the telephone terminal 18 is attempting to call. Assume this party is a "stimulus" based telephone terminal 408 connected to a node 404 of the packet switched network 44. The remote network services unit 43 determines that the party 408 is busy. At step 110, the remote network services unit 43 will send to the gateway adapter 40 communication control data to indicate that the call cannot be completed for the time being. At step 112, the gateway adapter 40 receives this communication control data and invokes the device emulator 62 to respond to the network services unit in the same manner and form as a "stimulus" based telephone terminal would. In this example, the response is an acknowledgement to the message.

The communication control data received by the gateway adapter 40 cannot be sent to the PBX system 10 directly because the telephone terminal 18 is not designed to handle this data. For instance, the "stimulus" based telephone terminals designed to interact with the network services unit 43 have a text display that shows the message "busy" when the line of the called party is busy. In contrast, the telephone terminal 18 has no display and relies on a special tone to indicate to the user that the line of the called party is busy. At step 114, the device emulator 62 will perform a functional translation, generating a control signal that is passed to the PBX interface 52 where it is translated according to the protocol used by the PBX system 10 to indicate by a certain tone that the line is busy. At step 116, the main processing unit 14 receives the signal and consults the telephone terminal profile 38 associated with the telephone terminal 18. The telephone terminal profile 38 states that when a busy line condition is encountered, a busy tone should be generated on the line at a volume level of 5 on a scale of 1 to 10, where 1 corresponds to a low intensity tone and 10 corresponds to a high intensity tone. The volume level of the tone is programmable at each telephone terminal 18, 20, 22 and 24 to suit the preferences of the individual users. At step 118, the busy tone at volume level 5 is applied to the telephone terminal 18.

The process ends at step 120.

Figure 8:
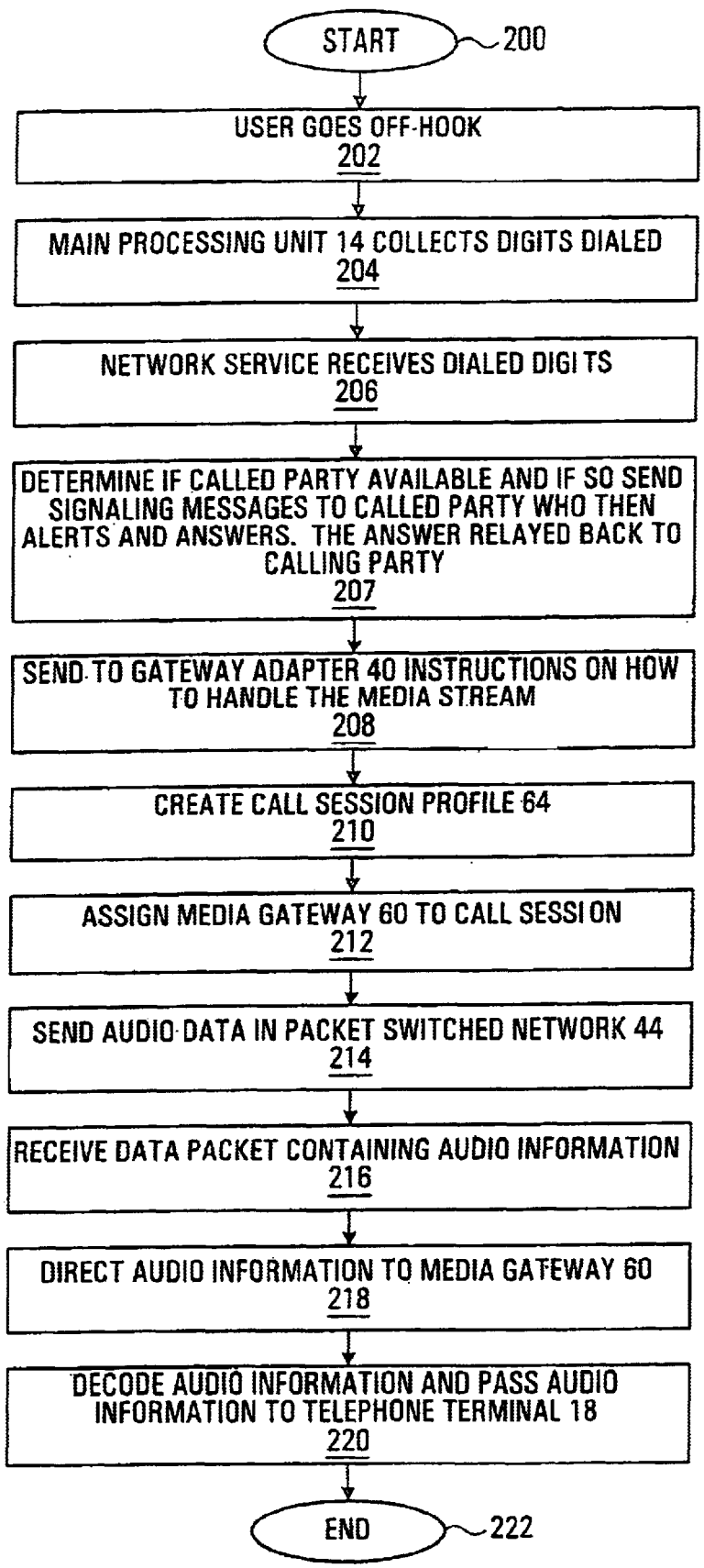
FIG. 8 is a flowchart illustrating the various events that take place during a successful call origination session spanning the PBX domain and the packet switched network.

Now assume that the call can be completed. The flowchart that illustrates the events taking place in this case is shown in FIG. 8. The steps 200, 202, 204 and 206 are identical to the steps 100, 102, 104 and 106 and will not be described again.

At step 208 the network services unit 43 is "aware" that the called party at telephone terminal 408 is available and sends to the gateway adapter 40 a communication control data indicating how to handle the media signals, in particular, the IP address where the media signals are to be sent (the address could designate the called party or any other intermediate unit or entity through which the media signals need to pass), the particular type of encoding algorithm to use and transaction control information, among others.

At step 210 the gateway adapter 40 receives the communication control data and invokes the call session management functional unit 63 that creates a call session profile 64 for this particular call. The call session profile 64 contains all the information that is needed by the gateway adapter 40 to manage the call session. As part of the creation of the call session profile 64, a media path through the gateway adapter 40 is set. This is done by assigning (step 212) a media gateway 60 to this particular call. The function of the media gateway 60 is to receive from the external telephone line port 26, 28, 32 and 34 media signals and convert those signals in a form that is suitable for transmission through the packet switched network 44. In a specific example, the media signal at the external trunk port 26, 28, 32 and 34 is analog. The analog stream is encoded by the media gateway by using the speech-encoding algorithm specified by the remote network services unit 43. This media path is maintained for the entire duration of the call.

At step 214, the encoded audio data is assembled into data packets and sent out through the packet switched network interface 48 to the address specified by the network services unit and maintained in the call session profile 64. Typically, this address would be the address at which the called party resides, namely the address of the telephone terminal 408.

At step 216 the gateway adapter 40 receives media signals from the telephone terminal 408 directed at the telephone terminal 18. The media signals are contained in data packets. The control unit 54 consults the call session profile 64 to determine how to handle the media signals. At step 218 the control unit 54 directs the media signals through the media gateway 60 assigned to the call. At step 220 the media gateway 60 will decode the audio information into an analog stream that is then passed through the PBX interface 52 and applied at the external telephone line port 26, 28, 32 or 34 assigned to the call.

The process ends at step 222.

The scenario in the case of a call terminating at the PBX 10 and originating from the packet switched network 44 is largely the reverse of what FIG. 8 shows with the exception that when the incoming call arrives at one of the trunk ports (26, 28, 32, or 34), it is treated as an inbound Direct Inward Dialing (DID) call by the PBX 10 and is subsequently delivered by the PBX 10 to the appropriate telephone terminal 18, 20, 22, or 24.

With reference to FIG. 6, the control unit 54 has the ability to set-up simultaneously a plurality of call session profiles 64, where each call session profile 64 may be a call session profile as described earlier or a call session profile during which the user transfers data, such as streamed audio to the telephone terminal 18. Assume for the sake of this example that all the call session profiles 64 shown in FIG. 6 involve the transfer of streamed audio from different sources, such as a weather report, traffic report, news service and music. All those audio streams are received simultaneously by the gateway adapter 40 that implements a selection mechanism to determine which ones of the audio streams will be directed to the media gateway 60 and ultimately directed to the telephone terminal 18. The control unit 54 responds to a control signal generated from the PBX system 10 to switch from one audio stream to another audio stream. Such control signal may be any kind of signal that is recognizable by the gateway adapter 40. For example, when the user at the telephone terminal enters a sequence of DTMF tones, the resulting control data generated within the PBX system 10 is conveyed to the gateway adapter 40 that switches audio streams. By successively entering various sets of tones, the user can switch through the entire set of audio streams.

Call Session Between Two Telephone Terminals of the PBX System

Figure 9:
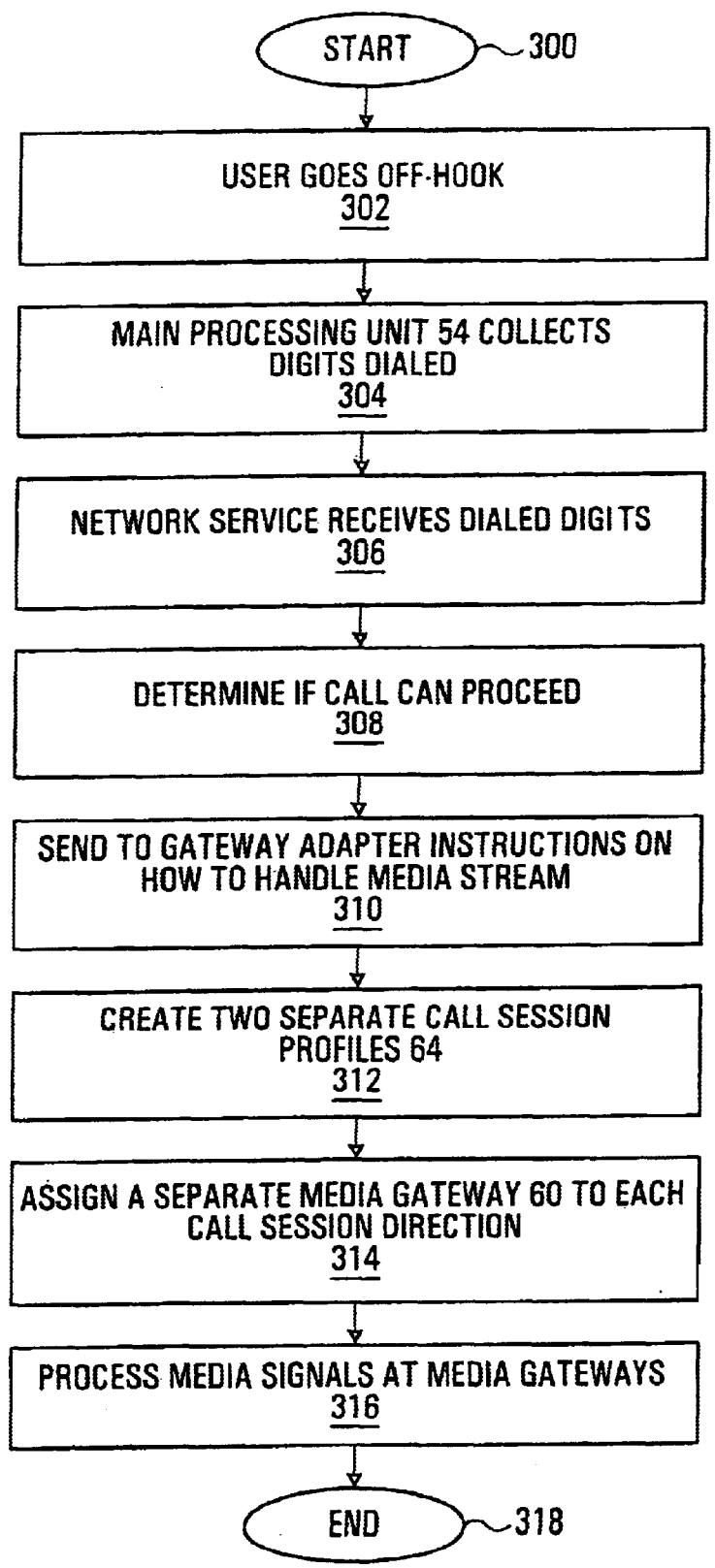
FIG. 9 is a flowchart illustrating the various events that take place during a successful call session involving two telephone terminals residing in the same PBX domain.
Figure 10:
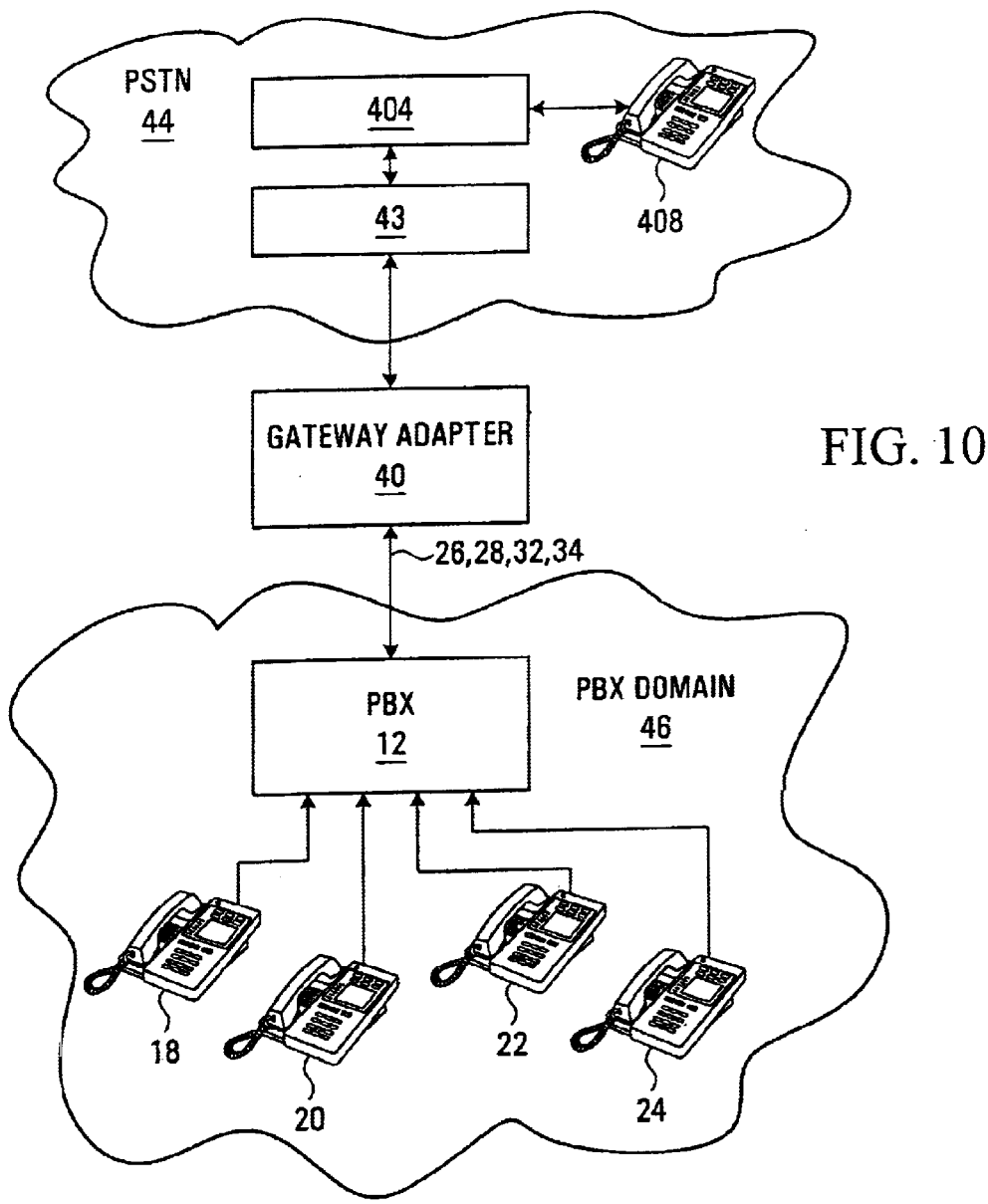
FIG. 10 is a block diagram similar to the block diagram shown in FIG. 3, providing additional details on the packet switched network.

This case will be described in connection with the flowchart of FIG. 9 and the block diagram of FIG. 10. The steps 300, 302, 304 and 306 are identical to the steps 100, 102, 104 and 106 and will not be described again. When the remote network services unit 43 receives the dialed digits it determines that the user is attempting to set up a call session between two telephone terminals connected to the same gateway adapter. Assume for the sake of this example that the user at the telephone terminal 18 is attempting to set up a call session with a user at the telephone terminal 20.

At step 308, the remote network services unit 43 determines if the call can proceed because it knows the state of both terminals, and more specifically in this case, the state of terminal 20. The remote network services unit 43 sends to the gateway adapter 40 one or more data packets containing communication control data to initiate a call session with the telephone terminal 20.

After the gateway adapter 40 initiates the appropriate request to the PBX 10 to alert terminal 20 and after terminal 20 answers, and the answer is relayed back through to the remote network services unit, then at step 310 the remote network services unit 43 sends to the gateway adapter 40 communication control data on how to handle the media signals. Two sets of instructions are sent. The first set is associated to the media signals sent from the telephone terminal 18 while the second set is associated to the media signals sent from the telephone terminal 20. In response to the first set of instructions the call session management functional unit 63 creates a first call session profile 64. In response to the second set of instructions the call session management functional unit 63 creates a second call session profile 64. It will be appreciated that under this example, a call from one telephone terminal to another telephone terminal, where both terminals reside in the same PBX domain 46 is treated the same way as two separate calls spanning the PBX domain 46 and the packet switched network 44. The PBX 10 does not utilize its internal circuit switch to connect the two terminals, but rather the two terminals are connected together external to the PBX 10 via the packet network.

More specifically, under each call session profile 64 a media gateway 60 is assigned to each media signal direction of the call session (step 316). The media signals originating from the telephone terminal 18 pass through one media gateway 60 for encoding. Next the encoded media signals are sent to the packet switched network 44 with the address of the called party (that resides at the gateway adapter 40). The packet switched network 44 returns back the data packets and they are passed to another media gateway 60 for decoding and ultimately transfer to the telephone terminal 20. Also note that media signals transferred from the gateway adapter 40 to the PBX system 10 use two separate external telephone line ports 26, 28, 32 and 34, one for each telephone terminals 18, 20 involved in the call session.

The process ends at step 318.

Figure 11:
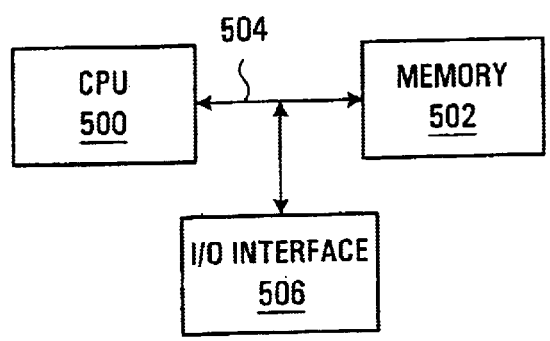
FIG. 11 is a block diagram of a computing apparatus on which a program element can be executed to implement the gateway adapter shown in FIG. 3.

The gateway adapter 40 can be implemented in software executed on any suitable computing apparatus. An example of such computing apparatus is shown in FIG. 11. The computing apparatus includes a Central Processing Unit (CPU) 500 that is coupled to a memory 502 over a data bus 504. The memory 502 holds the individual program elements that implement the various functional units of the gateway adapter 40 and also data on which the program elements operate. The computing apparatus communicates with the external world through an Input/Output (I/O) hardware interface 506 that connects with the data bus 504. Alternatively, components of the gateway adapter 40 can be realized in hardware instead of software. A specific example is the media gateways 60 that can be constructed from one or more digital signal processors of a type known to those skilled in the art.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A gateway adapter, comprising:
a) a PBX interface for connection to a PBX system entity to communicate with the PBX system entity using a PBX protocol, the PBX system entity establishing a functional domain within which call sessions can originate and terminate;
b) a network interface for communicating with a packet switched network entity establishing a packet switched network domain; and
c) an interoperation functional unit associated with said PBX interface and with said network interface, said interoperation functional unit being operative to effect manipulations on data received by said interfaces from the PBX system entity and the packet switched network entity, respectively, to allow the PBX system entity and the packet switched network entity to interoperate, and wherein said interoperation functional unit is responsive to communication control data from a remote network services unit operable for providing call processing services for a call session involving the PBX system entity.

2. A gateway adapter as defined in claim 1, wherein the PBX protocol is a protocol for a circuit-switched PBX system entity.

3. A gateway adapter as defined in claim 2, wherein the PBX system entity has a plurality of trunk ports, said gateway adapter being operative to simultaneously maintain a plurality of media signals exchange transactions with the PBX domain through respective external telephone line ports.

4. A gateway adapter as defined in claim 3, wherein said gateway adapter is operative to generate control data in the PBX protocol.

5. A gateway adapter as defined in claim 4, wherein the control data in the PBX protocol is output from said PBX interface.

6. A gateway adapter as defined in claim 4, wherein said interoperation functional unit includes a plurality of media gateways, each media gateway being operative to convert media signals received from the packet switched network in a format suitable for application to one of the external telephone line ports.

7. A gateway adapter as defined in claim 6, wherein the media signals convey audio information.

8. A gateway adapter as defined in claim 7, wherein the media signals received from the packet switched network include data packets.

9. A gateway adapter as defined in claim 7, wherein each media gateway is operative to convert media signals at one of the external telephone line ports into data packets suitable for transmission through the packet switched network.

10. A gateway adapter as defined in claim 3, wherein said interoperation functional unit includes a device emulator, said device emulator is operative to communicate with a remote network services unit through said network interface and emulate a device different from said gateway adapter.

11. A gateway adapter as defined in claim 10, wherein the device different from said gateway adapter is a telephone terminal of a first type.

12. A gateway adapter as defined in claim 11, wherein the PBX system entity is adapted to connect to a telephone terminal of a second type that is different from the telephone terminal of the first type.

13. A gateway adapter as defined in claim 3, wherein said gateway adapter is operative to maintain a plurality of call sessions simultaneously, each call session having media signals travelling on a path that extends outside the functional domain established by the PBX system entity, said gateway adapter being further operative to direct the media signals of a selected call session from the plurality of call sessions to a certain telephone terminal connected to the PBX system entity.

14. A gateway adapter as defined in claim 13, wherein said gateway adapter is responsive to a control signal from the certain telephone terminal to direct to the certain telephone terminal the media signals of a call session from the plurality of call sessions other than the selected call session.

15. A gateway adapter as defined in claim 1, wherein the call session has a flow of media signals, said interoperation functional unit being operative to process the media signals at least in part in dependence upon the communication control data from the network services unit.

16. A gateway adapter as defined in claim 15, wherein the communication control data includes coding algorithm information.

17. A gateway adapter as defined in claim 1, wherein the communication control data received from the remote network services unit includes an answer received from a terminal of a called party.

18. A combination, comprising:
a) a circuit switched PBX system entity for connection to a plurality of telephone terminals; and
b) a gateway adapter associated with said PBX system entity, said gateway adapter allowing at least one of the telephone terminals to establish a call session with a remote entity residing in a packet switched network, and wherein said gateway adaptor is responsive to communication control data from a remote network services unit operable for providing call processing services for a call session involving the PBX system entity.

19. A combination as defined in claim 18, wherein said gateway adapter comprises:
a) a PBX interface for connection to said PBX system entity to communicate with said PBX system entity using a PBX protocol, said PBX system entity establishing a functional domain within which call sessions can originate and terminate;
b) a network interface for communicating with the packet switched network entity establishing a packet switched network domain; and c) an interoperation functional unit associated with said PBX interface and with said network interface, said interoperation functional unit being operative to effect manipulations on data received by said interfaces from said PBX system entity and the packet switched network entity, respectively, to allow said PBX system entity and the packet switched network entity to interoperate.

20. A combination as defined in claim 19, wherein said PBX system entity has a plurality of trunk ports, said gateway adapter is operative to simultaneously maintain a plurality of media signals exchange transactions with the PBX domain through respective external telephone line ports.

21. A combination as defined in claim 20, wherein said interoperation functional unit includes a plurality of media gateways, each media gateway being operative to convert media signals received from the packet switched network in a format suitable for application to one of the external telephone line ports.

22. A combination as defined in claim 21, wherein the media signals convey audio information.

23. A combination as defined in claim 22, wherein each media gateway is operative to convert media signals at one of the trunk ports into data packets suitable for transmission through the packet switched network.

24. A combination as defined in claim 19, wherein said interoperation functional unit includes a device emulator, said device emulator being operative to communicate with the remote network services unit through said network interface and emulate a device different from said gateway adapter.

25. A combination as defined in claim 24, wherein the device different from said gateway adapter is a telephone terminal of a first type.

26. A combination as defined in claim 25, wherein the PBX system entity is adapted to connect to a telephone terminal of a second type that is different from the telephone terminal of the first type.

27. A combination as defined in claim 19, wherein said gateway adapter is operative to maintain a plurality of call sessions simultaneously, each call session having media signals travelling on a path that extends outside the functional domain established by the PBX system entity, said gateway adapter being further operative to direct the media signals of a selected call session from the plurality of call sessions to a certain telephone terminal connected to the PBX system entity.

28. A combination as defined in claim 27, wherein said gateway adapter is responsive to a control signal from a terminal connected to said PBX system entity to direct to the certain telephone terminal the media signals of a call session from the plurality of call sessions other than the selected call session.

29. A combination as defined in claim 18, wherein the communication control data received from the remote network services unit includes an answer received from a terminal of a called party.

30. A combination as defined in claim 18, wherein the communication control data includes coding algorithm information.

31. A method for upgrading a PBX system entity operative to provide call processing functions, said method comprising:
a) configuring the call processing functions of said PBX system entity such that it operates in a passthrough manner in terms of call origination and termination; and b) connecting to the PBX system entity a device allowing the PBX system entity to interoperate with a remote network services unit residing in a packet switched network that is operative to provide call processing functions on call sessions established through said PBX system entity.

32. A gateway adapter, comprising:
a) a PBX interface means for connection to a PBX system entity to communicate with the PBX system entity using a PBX protocol, the PBX system entity establishing a functional domain within which call sessions can originate and terminate;
b) a network interface means for communicating with a packet switched network entity establishing a packet switched network domain; and
c) interoperation means associated with said PBX interface means and with said network interface means, said interoperation means being operative to effect manipulations on data received by said PBX interface means and said network interface means from the PBX system entity and the packet switched network entity, respectively, to allow the PBX system entity and the packet switched network entity to interoperate, and wherein said interoperation means is responsive to communication control data from a remote network services unit operable for providing call processing services for a call session involving the PBX system entity.

33. An apparatus for providing telephony-related services to a plurality of telephone terminals of a first type, said apparatus comprising a network interface for exchanging signals with a remote network services unit through a packet switched network, the apparatus implementing a device emulator to make the apparatus behave toward the remote network services unit as a telephone terminal of a second type, wherein the second type of telephone terminal are operable to interact with the remote network services unit, and where the telephone terminal of the first type is different from the telephone terminal of the second type; and wherein said apparatus further comprises a gateway adaptor comprising:
a) a PBX interface for connection to a PBX system entity to communicate with the PBX system entity using a PBX protocol, the PBX system entity establishing a functional domain within which call sessions can originate and terminate;
b) a network interface for communicating with a packet switched network entity establishing a racket switched network domain; and
c) an interoperation functional unit associated with said PBX interface and with said network interface, said interoperation functional unit being operative to effect manipulations on data received by said interfaces from the PBX system entity and the packet switched network entity, respectively, to allow the PBX system entity and the packet switched network entity to interoperate and wherein said interoperation functional unit is responsive to communication control data from a remote network services unit operable for providing call processing services for a call session involving the PBX system entity.

34. An apparatus as defined in claim 33, wherein the PBX protocol is a protocol for a circuit-switched PBX system entity.

35. An apparatus as defined in claim 34, wherein the PBX system entity has a plurality of trunk ports, said gateway adapter is operative to simultaneously maintain a plurality of media signals exchange transactions with the PBX domain through respective external telephone line ports.

36. An apparatus as defined in claim 35, wherein said gateway adapter is operative to generate control data in the PBX protocol.

37. An apparatus as defined in claim 36, wherein the control data in the PBX protocol is output from said PBX interface.

38. An apparatus as defined in claim 36, wherein said interoperation functional unit includes a plurality of media gateways, each media gateway being operative to convert media signals received from the packet switched network in a format suitable for application to one of the trunk ports.

39. An apparatus as defined in claim 38, wherein the media signals convey audio information.

40. An apparatus as defined in claim 39, wherein the media signals received from the packet switched network include data packets.

41. An apparatus as defined in claim 39, wherein each media gateway is operative to convert media signals at one of the trunk ports into data packets suitable for transmission through the packet switched network.

42. An apparatus as defined in claim 35, wherein said interoperation functional unit includes a device emulator, said device emulator is operative to communicate with a remote network services unit through said network interface and emulate a device different from said gateway adapter.

43. An apparatus as defined in claim 42, wherein the device different from said gateway adapter is a telephone terminal of a first type.

44. An apparatus as defined in claim 43, wherein the PBX system entity is adapted to connect to a telephone terminal of a second type that is different from the telephone terminal of the first type.

45. An apparatus as defined in claim 35, wherein said gateway adapter is operative to maintain a plurality of call sessions simultaneously, each call session having media signals travelling on a path that extends outside the functional domain established by the PBX system entity, said gateway adapter being further operative to direct the media signals of a selected call session from the plurality of call sessions to a certain telephone terminal connected to the PBX system entity.

46. An apparatus as defined in claim 45, wherein said gateway adapter is responsive to a control signal from the certain telephone terminal to direct to the certain telephone terminal the media signals of a call session from the plurality of call sessions other than the selected call session.

47. An apparatus as defined in claim 33, wherein the call session has a flow of media signals, said interoperation functional unit being operative to process the media signals at least in part in dependence upon the communication control data from the network services unit.

48. An apparatus as defined in claim 47, wherein the call session is established between a first and second telephone terminals connected to the PBX system entity, said gateway adapter being operative to exchange media signals with the first telephone terminal through a first one of the trunk ports and exchange media signals with the second telephone terminal through a second one of the trunk ports.

49. An apparatus as defined in claim 48, wherein the media signals of the call session pass through said network interface.

50. An apparatus as defined in claim 48, wherein the media signals of the call session do not pass through said network interface.

51. An apparatus as defined in claim 47, wherein the communication control data includes coding algorithm information.

52. An apparatus as defined in claim 33, wherein the communication control data received from the remote network services unit includes an answer received from a terminal of a called party.

53. An apparatus for providing telephony-related services to a plurality of telephone terminal means of a first type, said apparatus comprising a network interface means for exchanging signals with a remote network services unit through a packet switched network, the apparatus implementing a device emulator means to make the apparatus behave toward the remote network services unit as a telephone terminal means of a second type, wherein the second type of telephone terminal means are operable to interact with the remote network services unit, and where the telephone terminal means of the first type is different from the telephone terminal means of the second type.

* * * * *

UNITED STATES PATENT AND TRADEMARK OFFICE
CERTIFICATE OF CORRECTION

PATENT NO. : 6,920,130 B2
DATED : July 19, 2005
INVENTOR(S) : Kenneth S. Ramey

It is certified that error appears in the above-identified patent and that said Letters Patent is hereby corrected as shown below:

Column 13,
Line 48, delete "racket" and insert -- packet --.

Signed and Sealed this

Thirty-first Day of January, 2006

JON W. DUDAS
*Director of the United States Patent and Trademark Office*